United States Patent
Ogle et al.

(10) Patent No.: US 10,961,445 B2
(45) Date of Patent: Mar. 30, 2021

(54) TRACKING PRODUCTION OF OIL, GAS, AND WATER FROM SUBTERRANEAN FORMATION BY ADDING SOLUBLE TRACERS COATED ONTO SOLID PARTICULATE

(71) Applicant: Multi-Chem Group, LLC., Houston, TX (US)

(72) Inventors: James Ogle, Houston, TX (US); Liang Xin Xu, The Woodlands, TX (US); Zhiwei Yue, Houston, TX (US); Ronald Oliver Bosch, Houston, TX (US); Andrew Bailey Slocum, Houston, TX (US); Amber Kridner, Houston, TX (US)

(73) Assignee: Multi-Chem Group, LLC, Houston, TX (US)

( * ) Notice: Subject to any disclaimer, the term of this patent is extended or adjusted under 35 U.S.C. 154(b) by 0 days.

(21) Appl. No.: 16/777,155

(22) Filed: Jan. 30, 2020

(65) Prior Publication Data
US 2020/0283678 A1    Sep. 10, 2020

Related U.S. Application Data

(60) Provisional application No. 62/815,636, filed on Mar. 8, 2019.

(51) Int. Cl.
*E21B 43/267*    (2006.01)
*C09K 8/92*    (2006.01)
(Continued)

(52) U.S. Cl.
CPC .................. *C09K 8/92* (2013.01); *C09K 8/68* (2013.01); *C09K 8/70* (2013.01); *C09K 8/80* (2013.01);
(Continued)

(58) Field of Classification Search
CPC ... C09K 8/92; C09K 8/68; C09K 8/80; C09K 8/82; C09K 8/86; C09K 2208/04; E21B 47/11; E21B 43/267
See application file for complete search history.

(56) References Cited

U.S. PATENT DOCUMENTS

| | | | |
|---|---|---|---|
| 4,457,372 A * | 7/1984 | Doster | C09K 8/08 |
| | | | 166/246 |
| 4,731,531 A | 3/1988 | Handke | |
| (Continued) | | | |

FOREIGN PATENT DOCUMENTS

| | | |
|---|---|---|
| WO | 2005103446 | 11/2005 |
| WO | 2013078031 | 5/2013 |
| (Continued) | | |

OTHER PUBLICATIONS

International Search Report and Written Opinion for Application No. PCT/US2020/017858, dated Jun. 5, 2020.

*Primary Examiner* — Silvana C Runyan
(74) *Attorney, Agent, or Firm* — Tenley Krueger; C. Tumey Law Group PLLC (57) ABSTRACT

A method may comprise introducing a first traceable solid particulate into a first formation zone of one or more subterranean formations, wherein the first traceable solid particulate may comprise a first soluble tracer coated onto a first solid particulate. The method may also comprise introducing a second traceable solid particulate into a second formation zone of the one or more subterranean formations, wherein the second traceable solid particulate may comprise a second soluble tracer coated onto a second solid particulate, wherein the second tracer and the first tracer may have a different chemical identity. The method may further comprise recovering produced fluid from the one or more subterranean formations and monitoring concentrations of at (Continued)

least the first soluble tracer and the second soluble tracer in the produced fluid.

20 Claims, 2 Drawing Sheets

(51) Int. Cl.
    *C09K 8/86*     (2006.01)
    *C09K 8/82*     (2006.01)
    *C09K 8/70*     (2006.01)
    *C09K 8/68*     (2006.01)
    *C09K 8/80*     (2006.01)
    *E21B 47/11*     (2012.01)

(52) U.S. Cl.
    CPC ............... *C09K 8/82* (2013.01); *C09K 8/86* (2013.01); *E21B 43/267* (2013.01); *E21B 47/11* (2020.05); *C09K 2208/04* (2013.01)

(56) References Cited

U.S. PATENT DOCUMENTS

| | | | |
|---|---|---|---|
| 6,691,780 B2 | 2/2004 | Nguyen et al. | |
| 6,725,926 B2 | 4/2004 | Nguyen et al. | |
| 8,234,072 B2 | 7/2012 | Smith, Jr. et al. | |
| 8,486,702 B2 | 7/2013 | Nguyen et al. | |
| 9,284,833 B2 | 3/2016 | Hewitt et al. | |
| 9,594,070 B2 * | 3/2017 | Rule | C09K 8/03 |
| 10,138,412 B2 * | 11/2018 | Kakadjian | C09K 8/035 |
| 2015/0096751 A1 * | 4/2015 | Shen | C09K 8/80 |
| | | | 166/280.2 |
| 2015/0323515 A1 | 11/2015 | Rule et al. | |
| 2017/0183560 A1 * | 6/2017 | McDaniel | C09K 8/04 |
| 2018/0038224 A1 | 2/2018 | Brierley et al. | |
| 2018/0106144 A1 * | 4/2018 | Hyde, Jr. | E21B 43/267 |
| 2018/0171392 A1 * | 6/2018 | McCann | G01N 33/2882 |
| 2018/0223180 A1 | 8/2018 | Hall et al. | |

FOREIGN PATENT DOCUMENTS

| | | |
|---|---|---|
| WO | 2014144464 | 9/2014 |
| WO | 2015193292 | 12/2015 |
| WO | 2016-016335 | 2/2016 |
| WO | 2016-205026 | 12/2016 |

* cited by examiner

TRACKING PRODUCTION OF OIL, GAS, AND WATER FROM SUBTERRANEAN FORMATION BY ADDING SOLUBLE TRACERS COATED ONTO SOLID PARTICULATE

BACKGROUND

In the treatment of subterranean formations, it is common to place particulate materials as a filter medium and/or a solid particulate in the near well bore area and in fractures extending outwardly from the well bore. In fracturing operations, solid particulate is carried into fractures created when hydraulic pressure is applied to these subterranean rock formations to a point where fractures are developed. Solid particulate suspended in a fracturing fluid may be carried outwardly away from the well bore within the fractures as they are created and extended with continued pumping. Upon release of pumping pressure, the solid particulate may remain in the fractures holding the separated rock faces in an open position forming a channel for flow of formation fluids back to the well bore.

The wellbore may penetrate a subterranean formation or multiple subterranean formations each of which may contain a reservoir where hydrocarbons may be produced from. In some examples, a wellbore may penetrate multiple reservoirs or zones. Hydraulic fracturing treatments may be applied to these zones to enhance the production of reservoir fluids such as oil, gas, and water from the zones. In some examples where the wellbore penetrates multiple zones, production fluids may be produced concurrently resulting in comingling of the production fluids in the wellbore. After the well has been completed and production of formation fluids begin, there may be a need to monitor the produced fluids, and more particularly, to monitor which zone the formation fluids are produced from to determine if additional treatments or workover applications need to be applied to the zone. There may be unique challenges in monitoring production from zones in offshore applications as oftentimes there may be complex tiebacks and comingling of production lines from multiple wellbores which may further complicate independent monitoring of producing zones. Oftentimes production must be shut down and a logging operation performed on an offshore well to determine which zones are producing fluids. Although land-based operations may present fewer complex challenges to production monitoring as compared to offshore applications, the production still may be shut down to perform a logging operation leading to downtime and increased costs.

BRIEF DESCRIPTION OF THE DRAWINGS

The drawing illustrates certain aspects of some of the embodiments of the present invention and should not be used to limit or define the invention.

DETAILED DESCRIPTION

The present disclosure is directed to production operations and, more particularly, to the use of tracers placed onto solid particulars for monitoring production. In some embodiments, a fracturing fluid may be used to place a traceable solid particulate into a subterranean formation, the traceable solid particulate comprising a soluble tracer on a solid particulate. Embodiments of the fracturing fluid may comprise carrier fluid, traceable solid particulate, proppant, and additives. As described herein, different soluble tracers may be placed into different zones so that the location of produced fluids may be determined. By monitoring the soluble tracer in the produced fluids, embodiments of the compositions and methods may be utilized for tracking the produced fluids such as oil, gas, and water, from each of the producing zones, and may identify the zone where a particular fluid is being produced.

More specifically, embodiments of compositions and methods of the present disclosure are directed to utilizing various tracers for the purpose of analyzing production from multiple subterranean zones. For example, a variety of tracers may be coated onto solid particulates, wherein each specific tracer may be soluble in the specific formation fluids present in each specific subterranean zone. In some embodiments, specific tracers may be soluble in specific formation fluids, for example, oil-soluble tracers and water-soluble tracers. In some embodiments, each zone may comprise both oil-soluble tracers and water-soluble tracers. Consequently, having oil-soluble tracers present in each zone helps determine the origin and location of produced oil. Moreover, specific tracers may be utilized during different stages of treatment operations. For the purpose of the present disclosure, treatment operations may include, but are not limited to, frac packing, gravel packing, and hydraulic fracturing.

The carrier fluid may be any of a variety of suitable fluids for suspending the traceable solid particulate, including slickwater fluids, aqueous gels, foams, emulsions, and viscosified surfactant fluids, among others. Suitable slickwater fluids may generally be prepared by addition of small concentrations of polymers (referred to as "friction reducing polymers") to water to produce what is known in the art as "slickwater." Suitable aqueous gels may generally include an aqueous fluid and one or more gelling agents. An aqueous gel may be formed by the combination of an aqueous fluid and coated particulates where the partitioning agent includes a gelling agent. Emulsions may include of two or more immiscible liquids such as an aqueous gelled liquid and a liquefied, normally gaseous fluid, such as nitrogen. Treatment fluids suitable for use in accordance with this disclosure may be aqueous gels including an aqueous fluid, a gelling agent for gelling the aqueous fluid and increasing its viscosity, and optionally, a cross-linking agent for cross-linking the gel and further increasing the viscosity of the fluid. The cross-linking agent may be provided as a component of the partitioning agent on the coated particulates and may be introduced into the aqueous gel by the combination of the coated particulates with an aqueous fluid. The increased viscosity of the gelled or gelled and cross-linked treatment fluid, among other things, may reduce fluid loss and may allow the fracturing fluid to transport significant quantities of suspended particulates.

Carrier fluids comprising aqueous-base fluids suitable for use as disclosed herein may include any of a variety of aqueous-base fluids suitable for use in subterranean applications. More specifically, the aqueous-base fluid may comprise fresh water, saltwater (e.g., water containing one or more salts dissolved therein), or seawater. Suitable saltwater may include a brine, such as a sodium chloride brine, a sodium bromide brine, a calcium chloride brine, a calcium bromide brine, a zinc bromide brine, a sodium formate brine, a potassium formate brine, and combinations thereof. Generally, the aqueous-base fluid may be from any source that does not contain an excess of compounds that may undesirably affect other components of the fracturing fluid. The aqueous-base fluid typically may be present in the carrier fluid composition in an amount up to about 99% by volume of the carrier fluid. For example, the aqueous-base fluid may be present in the carrier fluid in an amount of about 50% to about 99% by volume of the carrier fluid. Alternatively, the aqueous-base fluid may be present in the carrier fluid in an amount of about 50% to about 99% by volume, about 60% to about 90%, or about 70% to about 80% by volume of the carrier fluid.

The carrier fluid may include any number of additional additives, including, but not limited to, salts, surfactants (including non-ionic surfactants), acids, fluid loss control additives, gas, foamers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, gelling agents, breakers, weighting agents, proppants, particulate materials, and any combination thereof. One of ordinary skill in the art should be able to recognize and select suitable additives for use in the carrier fluid with the benefit of this disclosure.

The carrier fluid may include a friction reducing polymer. For example, the friction reducing polymer may be included in the carrier fluid to form a slickwater fluid. The friction reducing polymer may include, but is not limited to, a synthetic polymer, an anionic polymer, or a cationic polymer. For example, suitable synthetic polymers may include any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof; whereas the friction reducing polymer may be included in the carrier fluid to provide a desired amount of friction reduction.

The traceable solid particulates may include a solid particulate and a tracer coated onto the surface of the solid particulate. Where different traceable solid particulars may be used, for a first subterranean zone, a first traceable solid particulate may include a first solid particulate and a first tracer coated onto the surface of the first solid particulate. Whereas, for a second subterranean zone, a second traceable solid particulate may include a second solid particulate and a second tracer coated onto the surface of the second solid particulate. The traceable solid particulates may be introduced into a subterranean formation via a carrier fluid during a treatment operation. The subterranean formation may include multiple zones, such as the first, the second, a third, or up to twenty or more subterranean zones.

As used herein, "coated" does not require any particular degree of coating, but that a particle of the solid particulate may be at least partially coated with a tracer. In some embodiments, the tracers may be soluble tracers. A variety of soluble tracers may be suitable for any given application. For example, the selection of a particular tracer may be dependent upon factors such as identity of the solvent the tracer is to be dissolved in and the particular subterranean zone the solid particulate, including the tracer, is to be pumped into. The solvent may include formation fluids produced from the subterranean zone, including oil and water. Once the solid particulate, including the tracer, is placed into the wellbore, a near-wellbore area, or the subterranean formation, the tracer may begin to dissolve into the solvent when the solvent flows across the solid particulate. It should be noted that the terms "subterranean formation" and "wellbore" may be used interchangeably herein.

Wellbores having simultaneous production from one or more subterranean zones may require a variety of different solid particulates coated with different tracers. In certain embodiments, the tracers may include specific oil-soluble tracers and specific water-soluble tracers, whereby at least a specific oil-soluble tracer may be placed in each subterranean zone. For example, in a wellbore where there are two subterranean zones, the first subterranean zone may include a first solid particulate coated with a first oil-soluble tracer, whereas a second subterranean zone may include a second solid particulate coated with a second oil-soluble tracer, wherein the chemical identity of the first and the second oil-soluble tracer may be different.

Alternatively, for example, the first subterranean zone may include the first solid particulate coated with the first oil-soluble tracer in addition to a first solid particulate coated with a first water-soluble tracer, whereas the second subterranean zone may include the second solid particulate coated with the second oil-soluble tracer in addition to a second solid particulate coated with a second water-soluble tracer, wherein the chemical identity of the first and the second oil soluble tracer may be different, and wherein the chemical identity of the first and the second water-soluble tracer may be different.

The produced fluids may be monitored for concentrations of soluble tracer, thereby indicating which zones may be producing water, oil, or a combination thereof. For example, if the first oil-soluble tracer and the second water-soluble tracer are present in the produced fluids, it may be concluded that the first zone may be producing oil, whereas the second zone may be producing water. Conversely, if the produced fluids include the first water-soluble tracer, the second oil-soluble tracer, and the second water-soluble tracer, it may be concluded that the first zone may be producing water and the second zone may be producing a combination of oil and water.

Hence, monitoring concentrations of soluble tracer in produced fluids may provide information about the zones, such as the production rate from each zone, the ratio of oil to water produced from each zone, and whether a zone requires workover treatment, inter alia. Workover treatment may include a chemical treatment, such as surfactant flooding, which may aid in preferential production of oil versus water. In applications where multiple wellbores are tied back to a common conduit, such as in offshore operations and some land-based operations, the methods described herein may allow sampling of produced fluids from the common conduit and determination of the origin of the produced fluids. For example, the methods described herein may aid in the determination of the specific wellbore and zone in which the production fluids originated from.

The tracers disclosed herein may be compatible with fluids naturally present in the producing zone, as well as be compatible with any drilling fluids injected into the producing zone. The tracer may be susceptible to being readily detected qualitatively and analyzed quantitatively in the presence of the materials naturally occurring in the formation production fluids. For example, an aqueous sodium chloride solution may be utilized as a tracer but for the fact that most field brines contain sodium chloride in substantial quantities, therefore detection and analysis to differentiate the presence of sodium chloride used as a tracer in the presence of naturally-occurring sodium chloride would be difficult. Hence, embodiments disclosed herein include tracers comprising at least one tracer which is not naturally found in the formation fluid being analyzed.

Suitable hydrocarbon-soluble tracers may be liquid or solid, and soluble in or miscible with a hydrocarbon fluid, especially a naturally occurring oil or gas, or soluble in or miscible with an aqueous liquid. The tracer may comprise a dye which can be detected by visual means or by a spectroscopic method. Chemical tracer compounds may be used as tracers. Such compounds may be detected by liquid or gas chromatography coupled to mass spectroscopy, electron capture detectors or other methods of detection. Atomic absorption spectroscopy or other methods may be used.

The traceable solid particulates may comprise one or more tracers. For example, different combinations of tracers may be used to identify different production fluids found in differing producing zones. Tracers comprising different combinations of tracers be placed in different locations. For example, different combinations of tracers may be injected in different producing zones, so that passing fluid contacting each tracer at its respective location may be identified. Groups of tracers may be associated with each other where there is one tracer per particle with different particles each having a different tracer. Groups of tracers may also be associated with each other where there is one tracer per particle with different particles, each having a different tracer being mixed together in specific ratios where there can be more than one particle having the same tracer.

In some embodiments disclosed herein tracers may include, but are not limited to, classes of materials such as dyes, fluorescent materials, emissive materials, aromatic compounds (preferably halogenated aromatic compounds), cyclic compounds (preferably cycloalkanes, especially halogenated cycloalkanes) and aliphatic compounds (preferably halogenated aliphatic compounds). Each of these compounds may comprise suitable functional groups, or derivatives of such functional groups, including but not limited to: alkyl, alkenyl, alkynyl, nitro, aldehyde, haloformyl, carbonate ester, amine, hydroxyl, phenyl, benzyl, carboxylate, sulfonate, carbonyl, acetal, halogen, partially or completely halogenated hydrocarbon chains or cycles, carboxyl, ester, methoxy, ethoxy, hydroperoxy, peroxy, ether, sulfo, borono, borate, horonate, orthoester, carboxamide, amide, nitrile, isonitrile, thiol, sulphide, or sulfonyl, or any combination of those groups. Suitable tracers include but are not limited to 4-bromodiphenyl ether, 4-bromobenzophenone, heptadecafluoro-1-decane, 1,5-diaminoanthraquinone, (1-bromoethyl)benzene, 2-bromoethylethylether, 5-chloro-3-phenyl-2,1-benzisoxazole, 2,4'-dichloroacetophenone, and 1-chloroanthraquinone.

In some embodiments, one or more soluble dyes may be directly coated onto the solid particulate. In other embodiments, the soluble dyes may be included in a resin coating on the solid particulate. The resin coating may allow relatively slower dissolution of the soluble dye as compared to applications where the soluble dye is directly coated on the solid particulate without being included in a resin coating. The tracer may be blended homogeneously with the curable resin, then the resin and tracer mixture may be coated onto the external surface of the solid particulate in some embodiments the traceable solid particulate may be pre-coated. In other embodiments, the traceable solid particulate may be coated on-the-fly during a fracturing job treatment.

Additionally, or alternatively, the soluble dye may be admixed and/or otherwise included in a degradable polymer and coated on the solid particulate. In some embodiments, the degradable polymer may be an oil degradable polymer or a water degradable polymer. Degradable polymers may include those polymers that break down in presence or oil or water, dissolve into the oil or water, or otherwise release the soluble dye into a produced formation fluid. Some examples of degradable polymers may include, but are not limited to, polystyrene, styrene methacrylate copolymer, methyl methacrylate copolymer, polypropylene, polymethyl methacrylate, polyphenylene oxide, polyethylene, ethylene copolymer, propylene copolymer, polypropylene carbonate, ethylene interpolymer, propylene interpolymer, styrene interpolymer, polysaccharides (such as dextran or cellulose), chitin, chitosan, proteins, aliphatic polyesters, polylactic acids, poly(lactide)-co-poly(glycolide) copolymers, poly(E-caprolactones), poly(hydroxy ester ethers), poly(hydroxybutyrates), poly(anhydrides), polycarbonates, poly(orthoesters), poly(amino acids), poly(ethylene oxides), poly(phosphazenes), poly etheresters, polyester amides, polyamides, any terpolymers, block copolymers, graft copolymers, star block copolymers copolymers, or any combinations thereof.

In some embodiments of the present disclosure, the soluble dye may be included with a solid porous inorganic substrate such as a zeolite or other cage-like silicate structures. In some embodiments, the zeolite may be introduced into the wellbore alongside a solid particulate that includes a soluble dye, or with a solid particulate that does not include a soluble dye. The soluble dye may be coated directly onto the surface of the silicate or the soluble dye may be included in a resin or degradable polymer as described above.

Some water-soluble and oil-soluble dyes may include, but are not limited to, acid dyes, basic dyes, direct or substantive dyes, mordant dyes, vat dyes, reactive dyes, dispersive dyes, azo dyes, sulfur dyes, porphyrin dyes, metal organic framework dyes, radioactive tracers, graphene-based dyes, and combinations thereof. Acid dyes may be water soluble and may be characterized by anionic groups present on the dye molecule in solution. For example, acid dyes may include alizarin bure blue 88 and acid red 88. Basic dyes may be water-soluble and may be characterized by cationic groups present on the dye molecule in solution. Direct or substantive dyes may include, but are not limited to, direct blue 1, direct blue 14, and direct blue 15. Mordant dyes may be characterized by forming a coordination complex with a mordant or dye fixative and a dye base. The dye base may include bran, calcium carbonate, and other dye bases that may be apparent to one of ordinary skill in the art. Vat dyes may be insoluble in water. For example, vat dyes may include, but are not limited to, vat blue 1, vat blue 4, vat blue 20, vat blue 21, vat blue 25, green vat 1, green vat 3, and other vat dyes that would be apparent to one of ordinary skill in the art. Reactive dyes may be insoluble in water and may include a chromophore attached to a substituent. Some reactive dyes may include, without limitation, procion MX, cibacron F, and drimarene k. Dispersive dyes may be insoluble in water. Some examples of dispersive dyes may include, without limitation, dyes based on azobenzene such as disperse red 1 or disperse orange 37. Azo dyes may be insoluble in water and may be characterized by the functional group R—N=N—R' where R and R' may be aryl. Sulfur dyes may include dyes such as nitrophenol derivates and sulfide or polysulfide. An example may include sulfur black 1.

Some embodiments may include dyes that comprise chromophores such as acridine dyes which are derivates of acridine, anthraquinone dyes which are derivates of anthraquinone, arylmethane dyes such as diarylmethane dyes based on diphenyl methane and triarylmethane dyes which are derivates of triphenylmethane, azo dyes based on —N=N— azo structure, phthalocyanine dyes which are derivatives of phthalocyanine, quinone-imine dyes which are derivatives of quinone, azin dyes, eurhodin dyes, safranin dyes which are derivates of safranin, indamins, indophenol dyes which are derivates of indophenol, oxazin dyes which are derivates of oxazin, oxazone dyes which are derivates of oxazone, thiazine dyes, thiazole dyes, xanthene dyes, fluorene dyes which derivatives of fluorene, pyronin dyes, and rhodamine dyes which are derivatives of rhodamine.

In some embodiments, traceable solid particulates having a naturally dark color may be dyed or coated with tracers having a bright, vivid and intense color selected from oil soluble dyes or oil dispersible dyes. Suitable oil soluble dyes and oil dispersible dyes are comprised of a polymer-bound oil soluble or dispersable dye, such as a polyoxyalkylene substituted chromophore, wherein the dye may be encapsulated. Polymer-bound oil soluble or dispersable dyes may provide enhanced transparency and lightfastness, thereby enabling the color of the dye to be readily detected.

Some embodiments may include dyes that comprise chromophores such as acridine dyes which are derivates of acridine, anthraquinone dyes which are derivatives of anthraquinone, arylmethane dyes such as diarylmethane dyes based on diphenyl methane and triarylmethane dyes which are derivates of triphenylmethane, azo dyes based on —N=N— azo structure, phthalocyanine dyes which are derivatives of phthalocyanine, quinone-imine dyes which are derivatives of quinone, azin dyes, eurhodin dyes, safranin dyes which are derivates of safranin, indamins, indophenol dyes which are derivates of indophenol, oxazin dyes which are derivates of oxazin, oxazone dyes which are derivates of oxazone, thiazine dyes, thiazole dyes, xanthene dyes, fluorene dyes which derivatives of fluorene, pyronin dyes, and rhodamine dyes which are derivatives of rhodamine.

In other embodiments, oil soluble tracers may include, but are not limited to, halogenated aromatic compounds, a halogenated cycloalkane and a halogenated aliphatic compound, (such as 1,4-dibromobenzene, 1-chloro-4-iodobenzene, 5-iodo-m-xylene, 4-iodo-o-xylene, 3,5-dibromotoluene, 1,4-diiodobenzene, 1,2-diiodobenzene, 2,4-dibromomesitylene, 2,4,6-tribromotoluene, 1-iodonaphthalene, 2-iodobiphenyl, 9-bromophenanthrene, 2-bromonaphthalene, bromocyclohexane, 1,2-dichlorobenzene, 1,3-dichlorobenzene, 1,4-dichlorobenzene, 1-bromododecane, bromooctane, 1-bromo-4-chlorobenzene, bromobenzene, 1,2,3-trichlorobenzene, 4-chlorobenzylchloride and 1-bromo-4-fluorobenzene.), perfluorinated hydrocarbons (such as perfluoro butane, perfluoro methyl cyclopentane and perfluoro methyl cyclohexane), long chain alcohols ($C_6$ to $C_{24}$), and combinations thereof. The tracers may also include other water-soluble tracers such as, fluorinated benzoic acids, thiocyanate anion containing compounds, and combinations thereof.

In some embodiments alternative tracers may be included with the traceable solid particulates. For example, alternative tracers may include any chemicals that are not routinely present in produced fluids including, but not limited to, surfactants, wetting agents, emulsion breakers, scale inhibitors, hydrate inhibitors, asphaltene inhibitors, paraffin inhibitors, $H_2S$ preventing chemicals, corrosion inhibitors, microbially induced corrosion inhibitors, formation stabilizers, clay control additives, oil recovery agents, solid particulate stabilizing additives, consolidation additives, conformance additives for water shutoff and related, water ratio modifiers, lubricants, completion and packer fluid chemistries, fluid loss chemistries, fines inhibition agents, and combinations thereof The solid particulates may include a variety of suitable solid particulates that may be used in subterranean operations. The solid particulate may include, but is not limited to, sand, bauxite, ceramic materials, glass materials, polymer materials, polytetrafluoroethylene materials, nut shell pieces, cured resinous particulates including nut shell pieces, seed shell pieces, cured resinous particulates including seed shell pieces, fruit pit pieces, cured resinous particulates including fruit pit pieces, wood, composite particulates, and combinations thereof. Suitable composite particulates may include a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The solid particulate may also include graded sand. Other suitable solid particulate that may be suitable for use in subterranean applications may also be useful. The solid particulate may have a particle size of about 2 mesh to about 400 mesh, U.S. Sieve Series. Alternatively, the solid particulate may have a particle size of about 2 mesh to about 400 mesh, about 10 mesh to about 350 mesh, about 20 mesh to about 300 mesh, about 50 mesh to about 250 mesh, or about 100 mesh to about 200 mesh. Alternatively, for example, the solid particulate may have a particle size of about 10 mesh to about 70 mesh with distribution ranges of about 10 mesh to about 20 mesh, about 20 to about 40 mesh, about 40 to about 60 mesh, or about 50 to about 70 mesh, depending upon, for example, the particle sizes of the formation particulates to be screened out.

The traceable solid particulates may be carried by the carrier fluid, wherein the traceable solid particulates may be present in the carrier fluid in a concentration of about 0.1% to about 10% of the amount of proppant in the carrier fluid. Alternatively, the traceable solid particulate may be present in the carrier fluid in a concentration of 0.1% to about 10%, about 0.5% to about 8%, about 1% to about 6%, or about 2% to about 4% of the amount of proppant in the carrier fluid. One of ordinary skill in the art, with the benefit of this disclosure, should be able to select an appropriate amount of the traceable solid particulate to use for a particular application.

The fracturing fluid may also include proppant. The proppant may include a variety of proppant particulates, including, but not limited to, sand, bauxite, ceramic materials, glass materials, polymer materials, polytetrafluoroethylene materials, nut shell pieces, cured resinous particulates including nut shell pieces, seed shell pieces, cured resinous particulates including seed shell pieces, fruit pit pieces, cured resinous particulates including fruit pit pieces, wood, composite particulates, and combinations thereof. Suitable composite particulates may include a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Without limitation, the proppant particulates may include graded sand. Other suitable proppant particulates that may be suitable for use in subterranean applications may also be useful. Without limitation, the proppant particulates may have a particle size in a range from about 2 mesh to about 400 mesh, U.S. Sieve Series. By way of example, the proppant particulates may have a particle size of about 10 mesh to about 70 mesh with distribution ranges of 10-20 mesh, 20-40 mesh, 40-60 mesh, or 50-70 mesh, depending, for example, on the particle sizes of the formation particulates to be screen out. The proppant composition may be carried by the carrier fluid. Without limitation, the proppant composition may be present in the carrier fluid in a concentration of about 0.1 pounds per gallon ("ppg") (12 kg/m$^3$) to about 10 ppg (1198 kg/m$^3$), about 0.2 ppg (24 kg/m$^3$) to about 6 ppg (179 kg/m$^3$). These ranges encompass every number in between, for example. For example, the concentration may range between about 0.5 ppg (60 kg/m$^3$) to about 4 ppg (479 kg/m$^3$). One of ordinary skill in the art with the benefit of this disclosure should be able to select an appropriate amount of the proppant composition to use for a particular application.

The proppant may further include a curable resin, a tackifying agent, or both. Inclusion of the resin in the solid particulate may fill the fractures, thereby providing an in-situ mechanical screen that can hold the solid particulate in place while maintaining integrity of the well. Curable resins suitable for use in the solid particulate may include any resin that is capable of forming a hardened, consolidated mass. Many such curable resins are commonly used in consolidation treatments. In some embodiments, suitable resins may include, but are not limited to, two-component epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable curable resins, such as epoxy resins, may be cured with an internal catalyst or activator so that when pumped downhole, they may be cured using only time and temperature. Other suitable curable resins, such as furan resins, may generally require a time-delayed catalyst or an external catalyst to help activate the polymerization of the resins if the cure temperature is low, or less than 250° F. (121 C), but may cure under the effect of time and temperature if the formation temperature is above about 250° F. (121 C), above about 300° F. (149 C), above about 350° F. (177 C), or above about 400° F. (204 C).

Hence, selection of a suitable curable resin may be affected by the temperature of the subterranean formation into which the proppant may be introduced. For example, a subterranean formation having a bottom hole static temperature ("BHST") ranging from about 60° F. (16 C) to about 250° F. (121 C), two-component epoxy-based resins, including a hardenable resin component and a hardening agent component, may be preferred. Alternatively, for example, a subterranean formation having a BHST ranging from about 300° F. (149 C) to about 600° F. (315 C), a furan-based resin may be preferred. Conversely, for example, a subterranean formation having a BHST ranging from about 200° F. (93 C) to about 400° F. (204 C), either a phenolic-based resin or a one-component high temperature ("HT") epoxy-based resin may be suitable. Moreover, for example, a subterranean formation having a BHST of at least about 175° F. (79 C), a phenol/phenol formaldehyde/furfuryl alcohol resin may also be suitable. One of ordinary skill in the art should be able to recognize and select a suitable resin for use in consolidation treatment applications with the benefit of this disclosure.

In some embodiments, a solvent may be used with the curable resin. Suitable solvents may include, but are not limited to, butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d-limonene, fatty acid methyl esters, or combinations thereof. In some embodiments other solvents may include aqueous dissolvable solvents such as, methanol, isopropanol, butanol, glycol ether solvents, and combinations thereof. In other embodiments, glycol ether solvents may also be used, including, but not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent may be dependent on the curable resin chosen.

As mentioned above, the proppant may include a tackifying agent. Tackifying agents may be utilized in wellbore operations to retain or keep proppant in place when introduced into the wellbore and the surrounding subterranean formation. In some operations, hydraulic fracturing may involve pumping a particulate-free, viscous fluid, also known as a pad fluid, into a subterranean formation faster than the fluid can escape into the formation so that the pressure applied to the formation increases, and the formation breaks, creating an artificial fracture or enlarging a natural fracture. Then a proppant may be added to a fluid to form a slurry that may be pumped into the fracture to prevent the fracture from closing when the pumping pressure is released. Often, the proppant may be coated with a tackifying agent to enhance agglomeration and to prevent migration of the proppant after they are placed in the fracture.

Compositions suitable for use as tackifying agents in the present disclosure may include any compound that, when in liquid form or in a solvent solution, may form a tacky, non-hardening coating upon a particulate. Suitable tackifying agents for use in the present disclosure include, include, but are not limited to, non-aqueous tackifying agents, aqueous tackifying agents, silyl-modified polyamides, and reaction products of an amine and a phosphate ester. In addition to encouraging particulates to form aggregates, the use of a tackifying agent may reduce particulate flow back once the particulates are placed into a subterranean formation. The tackifying agents may be coated on the proppant used in an amount ranging from about 0.1% to about 5% by weight of the proppant. Alternatively, the tackifying agents may be coated on the proppant used in an amount of about 0.1% to about 5%, about 0.5% to about 4.5%, about 1% to about 4%, or about 2% to about 3% by weight of the proppant. In some embodiments, suitable tackifying agents may include non-aqueous tackifying agents. For example, suitable tackifying agents may include polyamides that are liquids or in solution and in thermal equilibrium with the subterranean formation. Further, the tackifying agents may be non-hardening when introduced into the subterranean formation. Other embodiments of tackifying agents may include condensation reaction products, such as polyacids and polyamines. The condensation reaction products may include compounds such as mixtures of $C_{36}$ dibasic acids comprising trimer and higher oligomers, as well as monomer acids that may be react with polyamines. Other polyacids may include trimer acids, synthetic acids produced from fatty acids, maleic anhydride, acrylic acid, and the like.

Non-aqueous tackifying agents suitable for use in the present disclosure may independently form a non-hardening coating or they may be combined with a multifunctional material capable of reacting with the non-aqueous tackifying agent to form a hardened coating. As used herein "hardened coating" defines the reaction of the tackifying agent with the multifunctional material resulting in a substantially non-flowable reaction product that exhibits a higher compressive strength in a consolidated agglomerate than compressive strength of the tackifying agent alone with the particulates. In this instance, the non-aqueous tackifying agent may function similarly to a curable resin.

Suitable multifunctional materials may include, but are not limited to: aldehydes, such as formaldehyde; dialdehydes, such as glutaraldehyde; hemiacetals or aldehyde releasing compounds; diacid halides; dihalides such as dichlorides and dibromides; polyacid anhydrides, such as citric acid; epoxides; furfuraldehyde; glutaraldehyde, or aldehyde condensates and the like; and combinations thereof. The multifunctional material may be combined or mixed with the tackifying agent in an amount of from about 0.01% to about 50% by weight of the tackifying agent to effect formation of the reaction product. Alternatively, the multifunctional material may be combined or mixed with the tackifying agent in an amount of 0.01% to about 50%, about 1% to about 45%, about 1% to about 40%, about 10% to about 30%, or about 15% to about 25% by weight of the tackifying agent to effect formation of the reaction product. Alternatively, the multifunctional material may be combined or mixed with the tackifying agent in an amount of about 0.01% to about 50%, or any percentage in-between by weight of the tackifying agent to effect formation of the reaction product.

Aqueous tackifying agents suitable for use in the present disclosure may not be significantly tacky when placed onto a particulate, but may be capable of being "activated" to transform the compound into a sticky, tackifying compound at a desirable time. As used herein, "activated" is defined as destabilized, coalesced and/or reacted. Such activation may occur before, during, or after the aqueous tackifying agent is placed in the subterranean formation. In some embodiments, a pretreatment may be first contacted with the surface of a proppant to prepare it to be coated with an aqueous tackifying agent. Suitable aqueous tackifying agents may be generally charged polymers comprising compounds that may form a non-hardening coating. The non-hardening coating may be formed when the tackifying agents, either individually or in combination with an activator, are in an aqueous solvent or solution. When placed on a proppant, the non-hardening coating may increase the continuous critical resuspension velocity of the particulate when contacted by a stream of water.

The aqueous tackifying agent may enhance the grain-to-grain contact between the individual particulates within the formation, such as particulates of the proppant, formation fines, or other particulates. As a result, the tackifying agent facilitates the consolidation of the proppants into a cohesive, flexible, and permeable mass. Suitable aqueous tackifying agents include any polymer having the ability to bind, coagulate, or flocculate a particulate. Additionally, polymers that may function as pressure sensitive adhesives may also be suitable. Aqueous tackifying agents suitable for use in the present invention may include, but are not limited to: acrylic acid polymers; acrylic acid ester polymers; acrylic acid derivative polymers; acrylic acid homopolymers; acrylic acid ester homopolymers, such as poly(methyl acrylate), poly (butyl acrylate), and poly(2-ethylhexyl acrylate); acrylic acid ester co-polymers; methacrylic acid derivative polymers; methacrylic acid homopolymers; methacrylic acid ester homopolymers, such as poly(methyl methacrylate), poly(butyl methacrylate), and poly(2-ethylhexyl methacrylate); acrylamido-methyl-propane sulfonate polymers; acrylamido-methyl-propane sulfonate derivative polymers; acrylamido-methyl-propane sulfonate co-polymers; and acrylic acid/acrylamido-methyl-propane sulfonate co-polymers, derivatives thereof, and combinations thereof.

In some embodiments, the soluble tracer may be intimately mixed with a curable resin prior to coating the soluble tracer onto the solid particulate. The soluble tracer may be blended homogeneously with the resin, and the resin may then be coated onto the solid particulate. The resin may include, but is not limited to, the diglycidyl ethers of bisphenol-A; the diglycidyl ethers of bisphenol-F; the glycidyl ethers of aminophenols; the glycidyl ethers of methylendianiline; and epoxy novolac resins. The resin coating should be compatible with the fracturing fluid. Generally, the resin may be present in an amount of about 0.1 (0.05 kg) to about 20 pounds (9 kg) of resin per 100 pounds (45 kg) of solid particulate material. Alternatively, the resin may be present in an amount of about 0.1 (0.05 kg) to about 20 (9 kg), about 0.5 (0.23 kg) to about 18 (8 kg), about 1 (0.5 kg) to about 16 (7 kg), about 2 (1 kg) to about 14 (6 kg), about 4 (1.9 kg) to about 12 (5 kg), or about 5 (2.3 kg) to about 10 pounds (4.5 kg) of solid particulate material.

The carrier fluid comprising the traceable solid particulate suspended therein may be injected into the specific zones of the subterranean formation under sufficient pressure to form fractures and/or enlarge existing fractures in the subterranean formation. In some embodiments, during fracturing operations, the traceable solid particulate may be carried into fractures created when hydraulic pressure is applied to the subterranean formations to a point where fractures are developed. The traceable solid particulate, suspended in the carrier fluid, may be carried outwardly away from a wellbore within the fractures as they are created and extended with continued pumping. Upon release of pumping pressure, the solid particulate material may remain in the fractures holding separated rock faces in an open position, forming a channel for flow of formation fluids back to the well bore. In some embodiments, the method of determining the zone (s) of origin of produced fluids includes determining the specific soluble tracer in the produced fluid, where each specific soluble tracer corresponds to a specific subterranean zone.

Laboratory tests may be performed on the soluble dyes and/or the alternative tracers to generate a calibration curve which may be correlated to the dye release rates and/or alternative tracer release rates. Data generated from the specific soluble dyes and/or alternative tracers pumped in a zone may then be used to determine similar production rates from similarly coated chemicals including, but not limited to, scale inhibitors, breakers, surfactants, biocides, and other encapsulated chemicals used in these applications. These may enable operators to predict the chemical release from different zones and determine where treatments are more applicable or less applicable. Laboratory tests may include, but may not be limited to ultraviolet spectrometry, ultraviolet visible spectrometry, ultraviolet radiation spectrometry, ultraviolet photoelectron, ultraviolet light spectrometry, liquid chromatography, or infrared testing. The testing may be initiated and completed either in the laboratory or on location.

In some embodiments, samples of produced fluid may be analyzed according to a process known as the inductively-coupled plasma (ICP) discharge method to determine from which subterranean zone the produced fluid originated from. According to the ICP discharge method, an aqueous sample may be nebulized within an ICP spectrometer and the resulting aerosol may be transported to an argon plasma torch located within the ICP spectrometer. The ICP spectrometer may measure the intensities of element-specific atomic emissions produced when the solution components, which includes the soluble tracer, enter the high-temperature plasma. An on-board computer within the ICP spectrometer may access a standard calibration curve to translate the measured intensities into elemental concentrations.

In other embodiments, the analysis for determining the amount of soluble tracer in the produced fluid may be accomplished by determining the elution rate and calculating the elution profile. More specifically, in analytical and organic chemistry, elution is the process of extracting one material from another by washing with a solvent. For example, in a liquid chromatography experiment, an analyte may be generally adsorbed, or "bound to", an adsorbent in a liquid chromatography column. The adsorbent, a solid phase (stationary phase), may be the tracer, wherein the tracer may be coated onto the solid particulate. Depending upon the tracer's composition, it may have varying affinities to "hold" onto other molecules, thereby forming a thin film on the surface of its particles. Elution removes the analytes from the tracer by running a solvent, or an "eluent", past the tracer/analyte complex. As the solvent molecules "elute", or travel down through the chromatography column, they may either pass by the tracer/analyte complex or they may displace the analyte by binding to the tracer in its place. After the solvent molecules displace the analyte, the analyte may be carried out of the column for analysis. Moreover, "elution time" of a solute may be defined as the time between the start of the separation (the time at which the solute enters the column) and the time at which the solute elutes. For example, under certain conditions, specific components will elute at specific times. The subsequent elution curves may be calibrated to determine the percentage of total fluid(s) located in each stage or subterranean zone.

Figure 1:
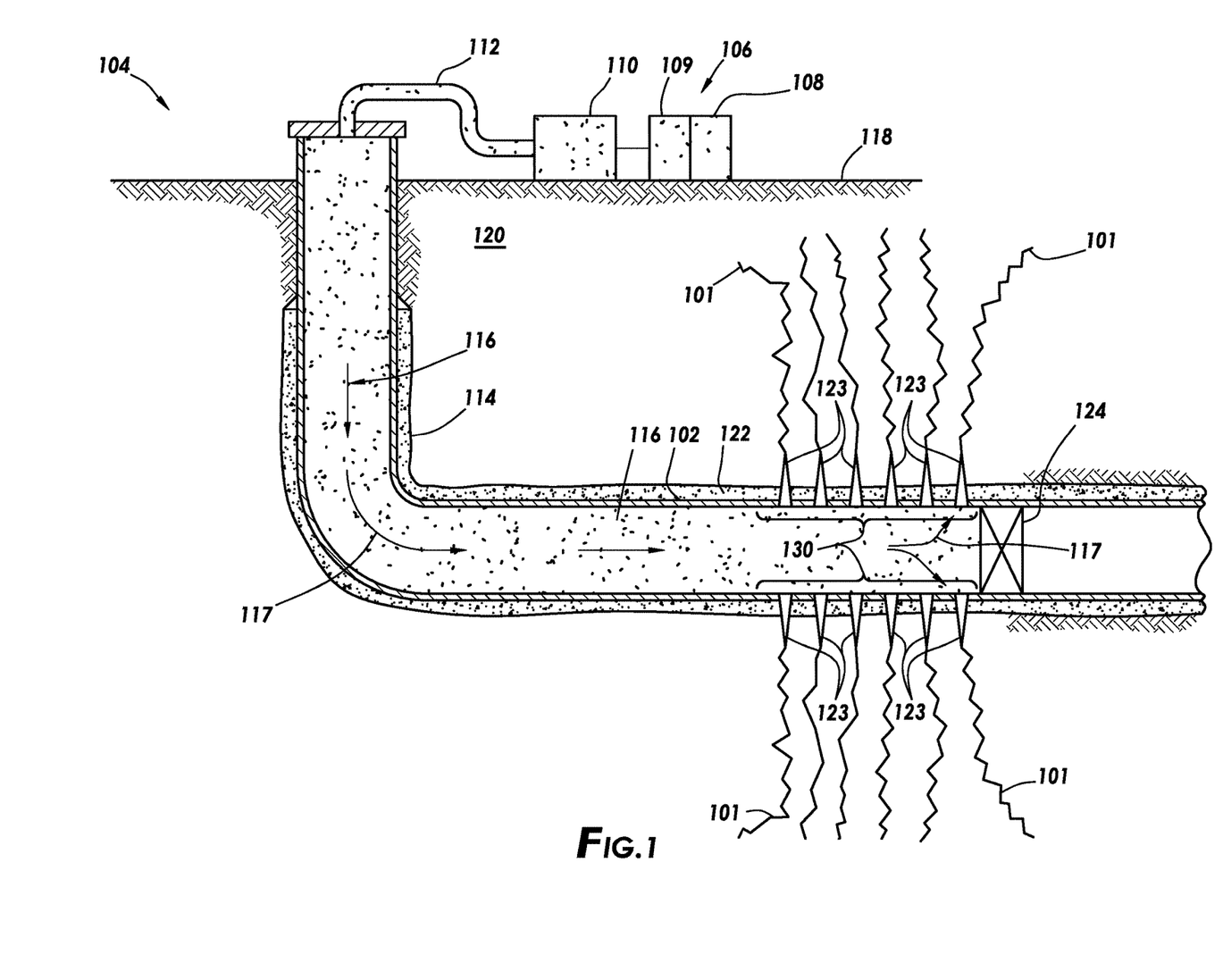
FIG. 1 is a schematic view of an example well system utilized for hydraulic fracturing.

FIG. 1 is a schematic view of an example well system 104 utilized for hydraulic fracturing. The well system 104 may be used to introduce a first traceable solid particulate 116 into fractures 100. The well system 104 may include a fluid handling system 106, which may include fluid supply 108, mixing equipment 109, pumping equipment 110, and wellbore supply conduit 112. Pumping equipment 110 may be fluidly coupled with the fluid supply 108 and wellbore supply conduit 112 to communicate a carrier fluid 117, which may include traceable solid particulate 116 into wellbore 114. The fluid supply 108 and pumping equipment 110 may be above the surface 118 while the wellbore 114 is below the surface 118.

The well system 104 may also be used for the injection of solid particulate-free fracturing fluid (e.g., a pad or pre-pad fluid) into the subterranean formation at an injection rate and pressure above the fracture gradient of the formation to create at least one fracture 101 in subterranean formation 120. The well system 104 may then inject the carrier fluid 117 into subterranean formation 120 surrounding the wellbore 114. Generally, a wellbore 114 may include horizontal, vertical, slanted, curved, and other types of wellbore geometries and orientations, and the solid particulate and traceable solid particulate 116 may generally be applied to subterranean formation 120 surrounding any portion of wellbore 114, including fractures 101. The wellbore 114 may include the casing 102 that may be cemented (or otherwise secured) to the wall wellbore 114 by cement sheath 122. Perforations 123 may allow communication between the wellbore 114 and the subterranean formation 120. As illustrated, perforations 123 may penetrate casing 102 and cement sheath 122 allowing communication between interior of casing 102 and fractures 101. A plug 124, which may be any type of plug for oilfield applications (e.g., bridge plug), may be disposed in wellbore 114 below the perforations 123.

In accordance with systems, methods, and/or compositions of the present disclosure, a perforated interval of interest 130 (depth interval of wellbore 114 including perforations 123) may be isolated with plug 124. A solid particulate-free fracturing fluid may be injected into the subterranean formation 120 at an injection rate above the fracture gradient to create at least one fracture 101 in subterranean formation 120. Then, traceable solid particulate 116 may be mixed with an carrier fluid and optionally proppant via mixing equipment 109, thereby forming a fracturing fluid 117, and then may be pumped via pumping equipment 110 from fluid supply 108 down the interior of casing 102 and into subsurface formation 120 at or above a fracture gradient of the subterranean formation 120. Pumping the fracturing fluid 117 at or above the fracture gradient of the subsurface formation 120 may create (or enhance) at least one fracture (e.g., fractures 101) extending from the perforations 123 into the subsurface formation 120. Alternatively, the fracturing fluid 117 may be pumped down production tubing, coiled tubing, or a combination of coiled tubing and annulus between the coiled tubing and the casing 102.

Figure 2:
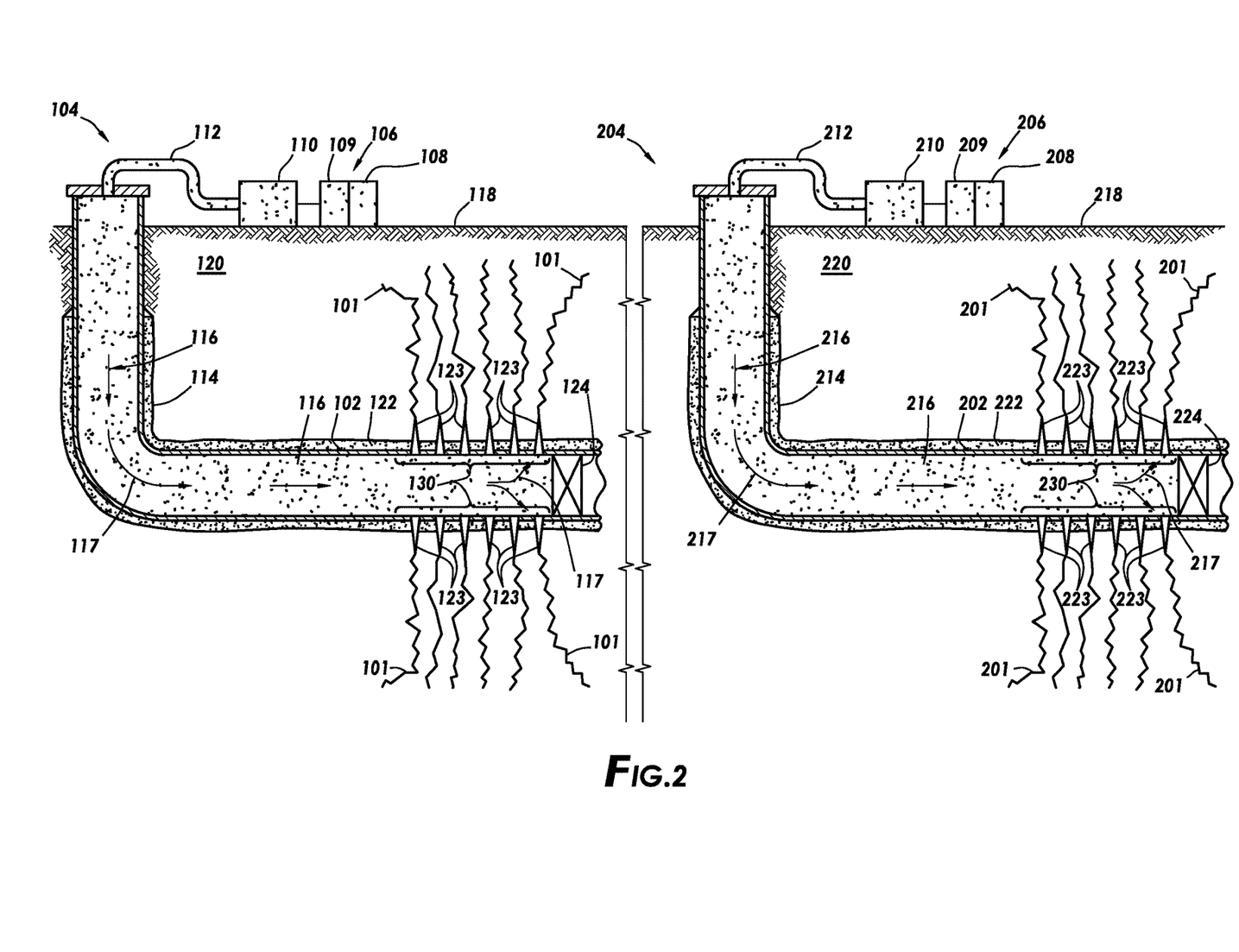
FIG. 2 is a schematic view of the first well system and a second well system utilized for hydraulic fracturing.

FIG. 2 is a schematic view of the first well system 104 and a second well system 204 utilized for hydraulic fracturing. The second well system 204 may be used to introduce a second traceable solid particulate 216 into fractures 200. The well system 204 may include a fluid handling system 206, which may include fluid supply 208, mixing equipment 209, pumping equipment 210, and wellbore supply conduit 212. Pumping equipment 210 may be fluidly coupled with the fluid supply 208 and wellbore supply conduit 212 to communicate a carrier fluid 217, which may include the second traceable solid particulate 216 into wellbore 214. The fluid supply 208 and pumping equipment 210 may be above the surface 218 while the wellbore 214 is below the surface 218.

The well system 204 may also be used for the injection of solid particulate-free fracturing fluid (e.g., a pad or pre-pad fluid) into the subterranean formation at an injection rate and pressure above the fracture gradient of the formation to create at least one fracture 201 in subterranean formation 220. The well system 204 may then inject the carrier fluid 217 into subterranean formation 220 surrounding the wellbore 214. Generally, a wellbore 214 may include horizontal, vertical, slanted, curved, and other types of wellbore geometries and orientations, and the solid particulate and the second traceable solid particulate 216 may generally be applied to subterranean formation 220 surrounding any portion of wellbore 214, including fractures 201. The wellbore 214 may include the casing 202 that may be cemented (or otherwise secured) to the wall wellbore 214 by cement sheath 222. Perforations 223 may allow communication between the wellbore 214 and the subterranean formation 220. As illustrated, perforations 223 may penetrate casing 202 and cement sheath 222 allowing communication between interior of casing 202 and fractures 201. A plug 224, which may be any type of plug for oilfield applications (e.g., bridge plug), may be disposed in wellbore 214 below the perforations 223.

In accordance with systems, methods, and/or compositions of the present disclosure, a perforated interval of interest 230 (depth interval of wellbore 214 including perforations 223) may be isolated with plug 224. A solid particulate-free fracturing fluid may be injected into the subterranean formation 220 at an injection rate above the fracture gradient to create at least one fracture 201 in subterranean formation 220. Then, the second traceable solid particulate 216 may be mixed with a carrier fluid and optionally proppant via mixing equipment 209, thereby forming a fracturing fluid 217, and then may be pumped via pumping equipment 210 from fluid supply 208 down the interior of casing 202 and into subsurface formation 220 at or above a fracture gradient of the subterranean formation 220. Pumping the fracturing fluid 217 at or above the fracture gradient of the subsurface formation 220 may create (or enhance) at least one fracture (e.g., fractures 201) extending from the pperforations 223 into the subsurface formation 220. Alternatively, the fracturing fluid 217 may be pumped down production tubing, coiled tubing, or a combination of coiled tubing and annulus between the coiled tubing and the casing 202.

The disclosed traceable solid particulate and associated methods may directly or indirectly affect any pumping systems, which representatively includes any conduits, pipelines, trucks, tubulars, and/or pipes which may be coupled to the pump and/or any pumping systems and may be used to fluidically convey the cement compositions downhole, any pumps, compressors, or motors (e.g., topside or downhole) used to drive the cement compositions into motion, any valves or related joints used to regulate the pressure or flow rate of the cement compositions, and any sensors (i.e., pressure, temperature, flow rate, etc.), gauges, and/or combinations thereof, and the like. The cement compositions may also directly or indirectly affect any mixing hoppers and retention pits and their assorted variations. The methods, compositions, and systems may include any of the various features of the methods, compositions, and systems disclosed herein, including one or more of the following statements:

Statement 1. A method may comprise: introducing a first traceable solid particulate into a first formation zone of one or more subterranean formations, wherein the first traceable solid particulate comprises a first soluble tracer coated onto a first solid particulate; introducing a second traceable solid particulate into a second formation zone of the one or more subterranean formations, wherein the second traceable solid particulate comprises a second soluble tracer coated onto a second solid particulate, wherein the second tracer and the first tracer have a different chemical identity; recovering produced fluid from the one or more subterranean formations; and monitoring concentrations of at least the first soluble tracer and the second soluble tracer in the produced fluid.

Statement 2. The method of statement 1, wherein the produced fluid comprises at least one fluid selected from the group consisting of oil, gas, water, and combinations thereof.

Statement 3. The method of statement 1 or 2, wherein the introducing the first traceable solid particulate into the one or more subterranean formations comprises introducing a fracturing fluid comprising a carrier fluid, proppant, and the first traceable solid particulate into the first formation zone, wherein at least a portion of the first traceable solid particulate and the proppant are deposited in the first formation zone of the one or more subterranean zones.

Statement 4. The method of statement 3, wherein the first tracer is oil-soluble, and wherein the fracturing fluid comprises an additional traceable solid particulate having a tracer that is water-soluble.

Statement 5. The method of statement 3 or 4, wherein the first traceable solid particulate is included in the fracturing fluid in amount of about 0.1% to about 10% based on concentration of the proppant.

Statement 6. The method of any of the preceding statements, wherein the first solid particulate and the second solid particulate are individually selected from the group consisting of sand, bauxite, ceramic materials, glass materials, polymer materials, polytetrafluoroethylene materials, nut shell pieces, cured resinous particulates including nut shell pieces, seed shell pieces, cured resinous particulates including seed shell pieces, fruit pit pieces, cured resinous particulates including fruit pit pieces, wood, composite particulates, and combinations thereof.

Statement 7. The method of any of the preceding statements, further comprising determining a composition of the first and the second formation zones of the one or more subterranean formations, wherein the composition is oil, gas, water, or a combination thereof.

Statement 8. The method of any of the preceding statements, further comprising sampling of the produced fluid of the at least first and second subterranean producing zones, and determining an origin of the produced fluid, wherein the sampling is taken from a common conduit.

Statement 9. The method of any of the preceding statements, wherein the first soluble tracer and the second soluble tracer are both water-soluble tracers, and wherein the method further comprising determining a zone in the one or more subterranean formations where water in the produced fluid was located based on the monitoring concentrations by correlating the concentrations to the zone.

Statement 10. The method of any of the preceding statements, wherein the first soluble tracer and the second soluble tracer are both oil-soluble tracers, and wherein the method further comprising determining a zone in the one or more subterranean formations where oil in the produced fluids was located based on the monitoring concentrations by correlating the concentrations to the zone.

Statement 11. The method of any of the preceding statements, wherein at least one of the first soluble tracer or the second soluble tracer is a water-soluble tracer selected from the group consisting of a soluble dye, fluorescent material, emissive material, an aromatic compound, a cyclic compound, an aliphatic compound, and combinations thereof.

Statement 12. The method of any of the preceding statements, wherein at least one of the first soluble tracer or the second soluble tracer comprises a soluble dye coated onto the first or the second solid particulate.

Statement 13. The method of any of the preceding statements, wherein the first or the second solid particulate comprises a zeolite.

Statement 14. The method of any of the preceding statements, wherein the at least one of the first soluble tracer or the second soluble tracer comprises an oil-soluble tracer selected from the group consisting of a halogenated aromatic compound, a halogenated cycloalkane, a halogenated aliphatic compound, perfluorinated hydrocarbons, long chain alcohols, and combinations thereof.

Statement 15. A method may comprise: recovering a produced fluid from one or more subterranean formations, wherein the produced fluid comprises a formation fluid and one or more tracers; analyzing the produced fluid to determine a concentration of the one or more tracers in the produced fluid; and correlating the concentration of the one or more tracers in the produced fluid to subterranean zones of production of the produced fluid.

Statement 16. The method of statement 15, further comprising introducing the one or more tracers into the subterranean zones on one or more solid particulates.

Statement 17. The method of statement 15 or 16, wherein the produced fluid comprises at least one fluid selected from the group consisting of oil, gas, water, and combinations thereof.

Statement 18. The method of statements 15, 16, or 17, wherein the correlating comprises correlating the concentration of the one or more tracers to one or more subterranean zones producing water, wherein the produced fluid comprises the water.

Statement 19. The method of statements 15, 16, 17, or 18, wherein the correlating comprises correlating the concentration of the one or more tracers to one or more subterranean zones producing oil, wherein the produced fluid comprises the oil.

Statement 20. The method of statements 15, 16, 17, 18 or 19, further comprising performing a remedial operation on at least one of the one or more subterranean zones producing the water.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present invention may be modified and practiced in different but equivalent manners apparent to those skilled in the art having the benefit of the teachings herein. Although individual examples are discussed, the invention covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method comprising:
   introducing a first traceable solid particulate into a first formation zone of one or more subterranean formations, wherein the first traceable solid particulate comprises a first soluble tracer coated onto a first solid particulate;
   introducing a second traceable solid particulate into a second formation zone of the one or more subterranean formations, wherein the second traceable solid particulate comprises a second soluble tracer coated onto a second solid particulate, wherein the second tracer and the first tracer have a different chemical identity;
   recovering produced fluid from the one or more subterranean formations, wherein the produced fluid comprises a formation fluid from the first formation zone and a formation fluid from the second formation zone, wherein the first soluble tracer is soluble in the formation fluid from the first formation zone and second soluble tracer is soluble in the formation fluid from the second formation zone;
   monitoring concentrations of at least the first soluble tracer and the second soluble tracer in the produced fluid; and
   correlating the concentrations of the first soluble tracer and the second soluble tracer in the produced fluid to subterranean zones of production of the produced fluid.

2. The method of claim 1 wherein the produced fluid comprises at least one fluid selected from the group consisting of oil, gas, water, and combinations thereof.

3. The method of claim 1, wherein the introducing the first traceable solid particulate into the one or more subterranean formations comprises introducing a fracturing fluid comprising a carrier fluid, proppant, and the first traceable solid particulate into the first formation zone, wherein at least a portion of the first traceable solid particulate and the proppant are deposited in the first formation zone of the one or more subterranean zones.

4. The method of claim 3, wherein the first tracer is oil-soluble, and wherein the fracturing fluid comprises an additional traceable solid particulate having a tracer that is water-soluble.

5. The method of claim 3, wherein the first traceable solid particulate is included in the fracturing fluid in amount of about 0.1% to about 10% based on concentration of the proppant.

6. The method of claim 1, wherein the first solid particulate and the second solid particulate are individually selected from the group consisting of sand, bauxite, ceramic materials, glass materials, polymer materials, polytetrafluoroethylene materials, nut shell pieces, cured resinous particulates including nut shell pieces, seed shell pieces, cured resinous particulates including seed shell pieces, fruit pit pieces, cured resinous particulates including fruit pit pieces, wood, composite particulates, and combinations thereof.

7. The method of claim 1 further comprising determining a composition of the first and the second formation zones of the one or more subterranean formations, wherein the composition is oil, gas, water, or a combination thereof.

8. The method of claim 1 further comprising sampling of the produced fluid of the at least first and second subterranean producing zones, and determining an origin of the produced fluid, wherein the sampling is taken from a common conduit.

9. The method of claim 1, wherein the first soluble tracer and the second soluble tracer are both water-soluble tracers, and wherein the method further comprising determining a zone in the one or more subterranean formations where water in the produced fluid was located based on the monitoring concentrations by correlating the concentrations to the zone.

10. The method of claim 1, wherein the first soluble tracer and the second soluble tracer are both oil-soluble tracers, and wherein the method further comprising determining a zone in the one or more subterranean formations where oil in the produced fluids was located based on the monitoring concentrations by correlating the concentrations to the zone.

11. The method of claim 1, wherein at least one of the first soluble tracer or the second soluble tracer is a water-soluble tracer selected from the group consisting of a soluble dye, fluorescent material, emissive material, an aromatic compound, a cyclic compound, an aliphatic compound, and combinations thereof.

12. The method of claim 1, wherein at least one of the first soluble tracer or the second soluble tracer comprises a soluble dye coated onto the first or the second solid particulate.

13. The method of claim 1, wherein the first or the second solid particulate comprises a zeolite.

14. The method of claim 1, wherein the at least one of the first soluble tracer or the second soluble tracer comprises an oil-soluble tracer selected from the group consisting of a halogenated aromatic compound, a halogenated cycloalkane, a halogenated aliphatic compound, perfluorinated hydrocarbons, long chain alcohols, and combinations thereof.

15. A method comprising:
    recovering a produced fluid from one or more subterranean formations, wherein the one or more subterranean formations comprise at least a first formation zone of production and a second formation zone of production, wherein the produced fluid comprises a formation fluid and at least a first soluble tracer and a second soluble tracer, wherein the at least first soluble tracer and the second soluble tracer are each coated onto solid particulates, and wherein the first soluble tracer is soluble in the formation fluid from the first formation zone and the second soluble tracer is soluble in the formation fluid from the second formation zone;
    analyzing the produced fluid to determine a concentration of the at least first soluble tracer and the second soluble tracer in the produced fluid; and
    correlating the concentration of the at least first soluble tracer and the second soluble tracer in the produced fluid to the at least first formation zone of production and the second formation zone of production of the produced fluid.

16. The method of claim 15 further comprising introducing the one or more tracers into the subterranean zones on one or more solid particulates.

17. The method of claim 15 wherein the produced fluid comprises at least one fluid selected from the group consisting of oil, gas, water, and combinations thereof.

18. The method of claim 15 wherein the correlating comprises correlating the concentration of the one or more tracers to one or more subterranean zones producing water, wherein the produced fluid comprises the water.

19. The method of claim 15 wherein the correlating comprises correlating the concentration of the one or more tracers to one or more subterranean zones producing oil, wherein the produced fluid comprises the oil.

20. The method of claim 18 further comprising performing a remedial operation on at least one of the one or more subterranean zones producing the water.

* * * * *